(12) United States Patent
Fujita et al.

(10) Patent No.: US 11,209,993 B2
(45) Date of Patent: Dec. 28, 2021

(54) PHYSICAL UNCLONABLE FUNCTION (PUF) FOR NAND OPERATOR

(71) Applicant: SANDISK TECHNOLOGIES LLC, Addison, TX (US)

(72) Inventors: Yuki Fujita, Yokohama (JP); Kazuto Oku, Kamakura (JP); Kyosuke Matsumoto, Sagamihara (JP)

(73) Assignee: SANDISK TECHNOLOGIES LLC, Addison, TX (US)

( * ) Notice: Subject to any disclaimer, the term of this patent is extended or adjusted under 35 U.S.C. 154(b) by 102 days.

(21) Appl. No.: 16/828,191

(22) Filed: Mar. 24, 2020

(65) Prior Publication Data

US 2021/0303182 A1 Sep. 30, 2021

(51) Int. Cl.
*G06F 11/30* (2006.01)
*G06F 3/06* (2006.01)
*H04L 9/32* (2006.01)
*H04L 9/06* (2006.01)
*G06F 12/14* (2006.01)

(52) U.S. Cl.
CPC .......... *G06F 3/0623* (2013.01); *G06F 3/0659* (2013.01); *G06F 3/0679* (2013.01); *H04L 9/0662* (2013.01); *H04L 9/3278* (2013.01)

(58) Field of Classification Search
CPC .... G06F 3/0623; G06F 3/0659; G06F 3/0679; H04L 9/0662; H04L 9/3278
See application file for complete search history.

(56) References Cited

U.S. PATENT DOCUMENTS

| | | | |
|---|---|---|---|
| 8,516,269 B1* | 8/2013 | Hamlet | G06F 21/445 713/189 |
| 9,472,298 B1 | 10/2016 | Louie et al. | |
| 10,468,104 B1* | 11/2019 | Anand | G11C 16/0466 |
| 10,770,146 B2* | 9/2020 | Lu | G11C 16/22 |
| 10,771,266 B2* | 9/2020 | Nowottnick | H04L 9/0662 |
| 2015/0055417 A1* | 2/2015 | Kim | G11C 16/10 365/185.19 |
| 2015/0278551 A1* | 10/2015 | Iyer | G06F 21/70 726/2 |

(Continued)

OTHER PUBLICATIONS

Prabhu et al., Extracting Device Fingerprints from Flash Memory by Exploiting Physical Variations, 2019.

*Primary Examiner* — Gary S Gracia
(74) *Attorney, Agent, or Firm* — Volpe Koenig

(57) ABSTRACT

Apparatus and methods implement a physical unclonable function (PUF) from NAND operations. A NAND flash memory device may generate an unclonable natural random sequence of bits based on a threshold voltage of a plurality of cells in a memory cell array. The unclonable natural random sequence may be stored starting at an address of the memory cell array. A selected subsequence of the unclonable natural random sequence may be stored in a first set of data latches, and target data may be stored in a second set of data latches. The NAND flash memory device may generate a physical unclonable function (PUF) output by applying an XOR operation to the target data and the selected subsequence. The PUF output may be stored in a set of registers or provided to a memory controller to be used for secure applications such as secure identity detection and secure data transfer.

20 Claims, 12 Drawing Sheets

(56) References Cited

U.S. PATENT DOCUMENTS

| | | | |
|---|---|---|---|
| 2016/0156476 A1* | 6/2016 | Lee | H04L 9/088 380/44 |
| 2016/0188908 A1* | 6/2016 | Chen | H04L 9/3278 726/34 |
| 2017/0048072 A1* | 2/2017 | Cambou | G09C 1/00 |
| 2017/0372306 A1* | 12/2017 | Kara-Ivanov | G06Q 20/40145 |
| 2018/0039581 A1* | 2/2018 | Hung | G11C 13/0069 |
| 2018/0176012 A1* | 6/2018 | Hung | H04L 9/3278 |
| 2019/0109718 A1* | 4/2019 | Nowottnick | H04L 9/3278 |
| 2019/0378575 A1* | 12/2019 | Lu | H04L 9/3278 |
| 2019/0392179 A1* | 12/2019 | Lu | G11C 7/20 |
| 2020/0044871 A1* | 2/2020 | Lu | G11C 11/4076 |
| 2020/0052893 A1* | 2/2020 | Lu | G06F 12/0292 |
| 2020/0213138 A1* | 7/2020 | Mondello | G11C 16/14 |
| 2020/0402589 A1* | 12/2020 | Lu | G06F 12/1408 |
| 2021/0055912 A1* | 2/2021 | Zalivaka | G06F 3/0653 |

\* cited by examiner

PHYSICAL UNCLONABLE FUNCTION (PUF) FOR NAND OPERATOR

FIELD OF INVENTION

The present disclosures generally relate to physical unclonable functions (PUFs), and in particular to PUFs created from basic NAND operations.

BACKGROUND

A physical unclonable function (PUF) is a physical object that, for a given input and conditions, generates a physically-defined digital fingerprint that serves as a unique identifier for a semiconductor device. When a physical stimulus or challenge is applied to a unique physical microstructure of the semiconductor device, the microstructure reacts in an unpredictable way due to the complex interaction of the stimulus with the physical microstructure of the device to generate an unpredictable response. The response can be used to generate a unique, strong cryptographic key or digital fingerprint from the physical microstructure.

Characteristics of a PUF include that it is unpredictable, uncontrollable and dependent on the uniqueness of the physical microstructure and/or random physical factors of the particular semiconductor device. Because of these characteristics, PUFs are impossible to duplicate or clone, and thus the resulting digital fingerprints are ideal for use in applications with high security requirements, including cryptography.

SUMMARY

Apparatus and methods implement a physical unclonable function (PUF) in a NAND flash memory device. The NAND flash memory device may generate an unclonable natural random sequence of bits based on a threshold voltage of a group of cells in a memory cell array. The NAND flash memory device may store the unclonable natural random sequence of bits starting at an address in a page of the memory cell array. The NAND flash memory device may store a selected subsequence of the unclonable natural random sequence of bits in a first set of data latches, and store a target data in a second set of data latches. The NAND flash memory device may generate a physical unclonable function (PUF) output by applying an XOR operation to the target data and the selected subsequence. The PUF output may be stored in a set of registers or provided to a memory controller to be used for secure applications such as secure identity detection and secure data transfer.

DETAILED DESCRIPTION OF THE EMBODIMENTS

Figure 1A:
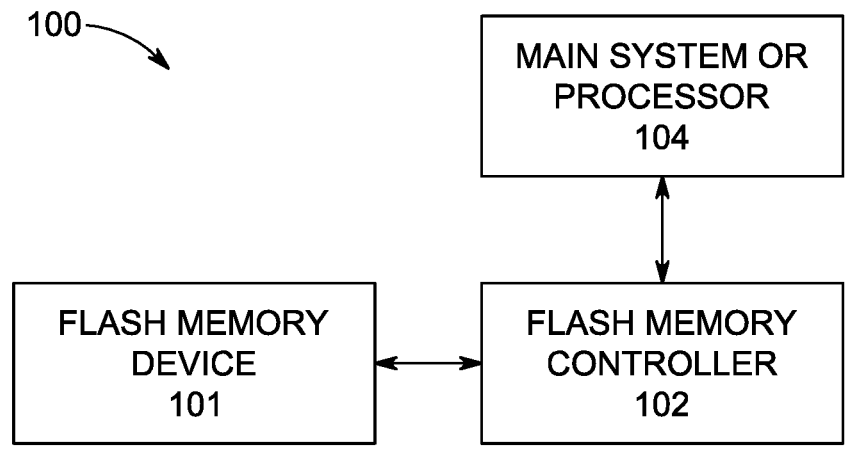
FIG. 1A shows a block diagram of an example computing system architecture, including a flash memory device, in accordance with the disclosures herein.

An example semiconductor device where PUF-based security may be used is a non-volatile flash memory device. Flash memory devices (also referred to as a flash memory dies or chips) are typically used for storage in other computing systems and often operate according to instructions from a flash memory controller. FIG. 1A shows a high-level block diagram of an example computing system 100 architecture, including a flash memory device 101 that interacts with a main system or processor 104 via instructions from the flash memory controller 102. The flash memory device 101 serves to store and provide stored data to the main system or processor 104 through the controller 102. In the examples described herein, the flash memory device 101 may be a NAND flash memory device 101. The flash memory device 101 may be on a different die or dies any of the other devices such as the flash memory controller 102 and/or the processor 104, or may be on the same die as any of the flash memory controller 102 and/or the processor 104.

According to the disclosures herein, a disclosed NAND PUF (a PUF for NAND operator) may be implemented in a NAND flash memory device (e.g., flash memory device 101 of FIG. 1A) to generate unclonable natural random sequences of bits using NAND basic operations. The unclonable natural random sequences may be applied to data as a digital key or fingerprint to keep the data secure. Although the disclosures herein describe the disclosed PUF implemented in a NAND flash memory device, the aspects disclosed herein may apply to any non-volatile memory cells where a VT distribution is random, and may be similarly implemented in other types of flash memory devices.

Non-volatile flash memory stores information in an array of memory cells (e.g., cells made from floating-gate transistors), and retains the information in the cells regardless of power supply. The cell is the minimum component of non-volatile memory and is able to store a particular number of bits. For example, a single-level cell (SLC) stores one bit of information per cell (1 bit/cell), a multi-level cell (MLC) stores 2 bits/cell, a triple-level cell (TLC) stores 3 bits/cell, and a quadruple-level cell (QLC) stores 4 bits/cell. The disclosures herein may be applied to SLC, MLC, QLC, or other types of multi-bit cells.

Figure 1B:
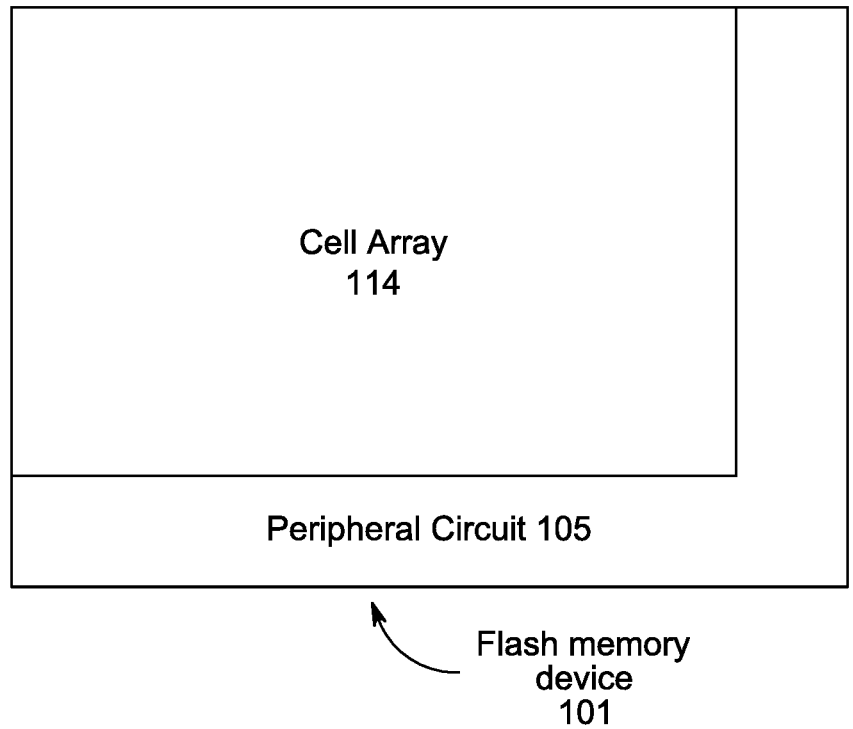
FIG. 1B shows a block diagram of an example NAND flash memory device for use in the computing system of FIG. 1A, in accordance with the disclosures herein.
Figure 1C:
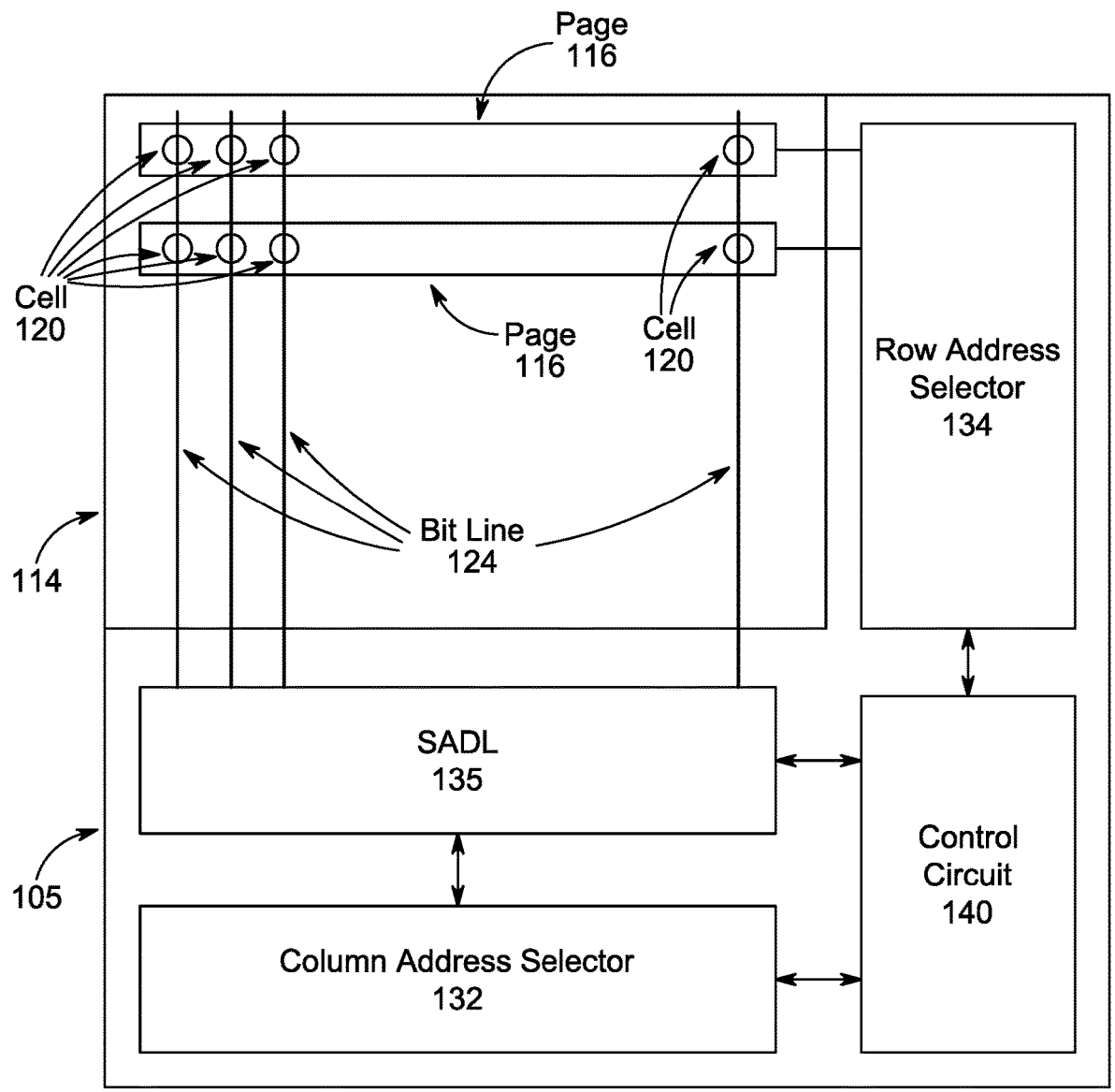
FIG. 1C shows a block diagram of example components of a NAND flash memory device, as in FIGS. 1A and 1B, in accordance with the disclosures herein.

FIG. 1B shows a block diagram of an example NAND flash memory device 101 for use in the computing system 100 of FIG. 1A, in accordance with the disclosures herein. The example flash memory device 101 includes peripheral circuit 105, which is comprised of one or more electronic circuits, and a cell array 114, which is comprised of the non-volatile memory. The cell array 114 may be on a different die or dies than the peripheral circuit 105, or may be on the same die. FIG. 1C shows a block diagram of some of the example components of the flash memory device 101. The cell array 114 is comprised of an array of cells 120, and a page 116 includes the cells 120 in a common row. Cells 120 are connected along columns to the peripheral circuit 105 via bit lines (BLs) 124. The peripheral circuit may include, but is not limited to include, a sense amplifier an data latches (SADL) circuit 135, a column address selector 132, a row address selector 134, and a control circuit 140.

A page 116 is a minimum memory unit that can be programmed (written to) or read, and comprises the cells 120 in the row. The page size refers to the number of cells 120 in a page 116, which is equivalently equal to the number of columns/BLs 124. The SADL 135 receives data from the cells 120 through the bit lines 124 and writes data to the cells 120 through the bit lines 124. The column address selector 132 selects the column address, which indicates a particular bit line 124 and a particular data latch (e.g., XDL) in the SADL 135. The row address selector 134 selects the row address in order to access a corresponding page 116. The combination of a column address and row address indicates one cell 120.

The control circuit 140 controls the operations of the flash memory device 101. For example, the control circuit 140 provides commands to control operations inside SADL 135, access cells 120 by sending a column address to column address selector 132 and/or row address to row address selector 134, etc. Operations external to the flash memory device 101 may be issued by commands received, for example, from the flash memory controller 102 in FIG. 1A.

Figure 1D:
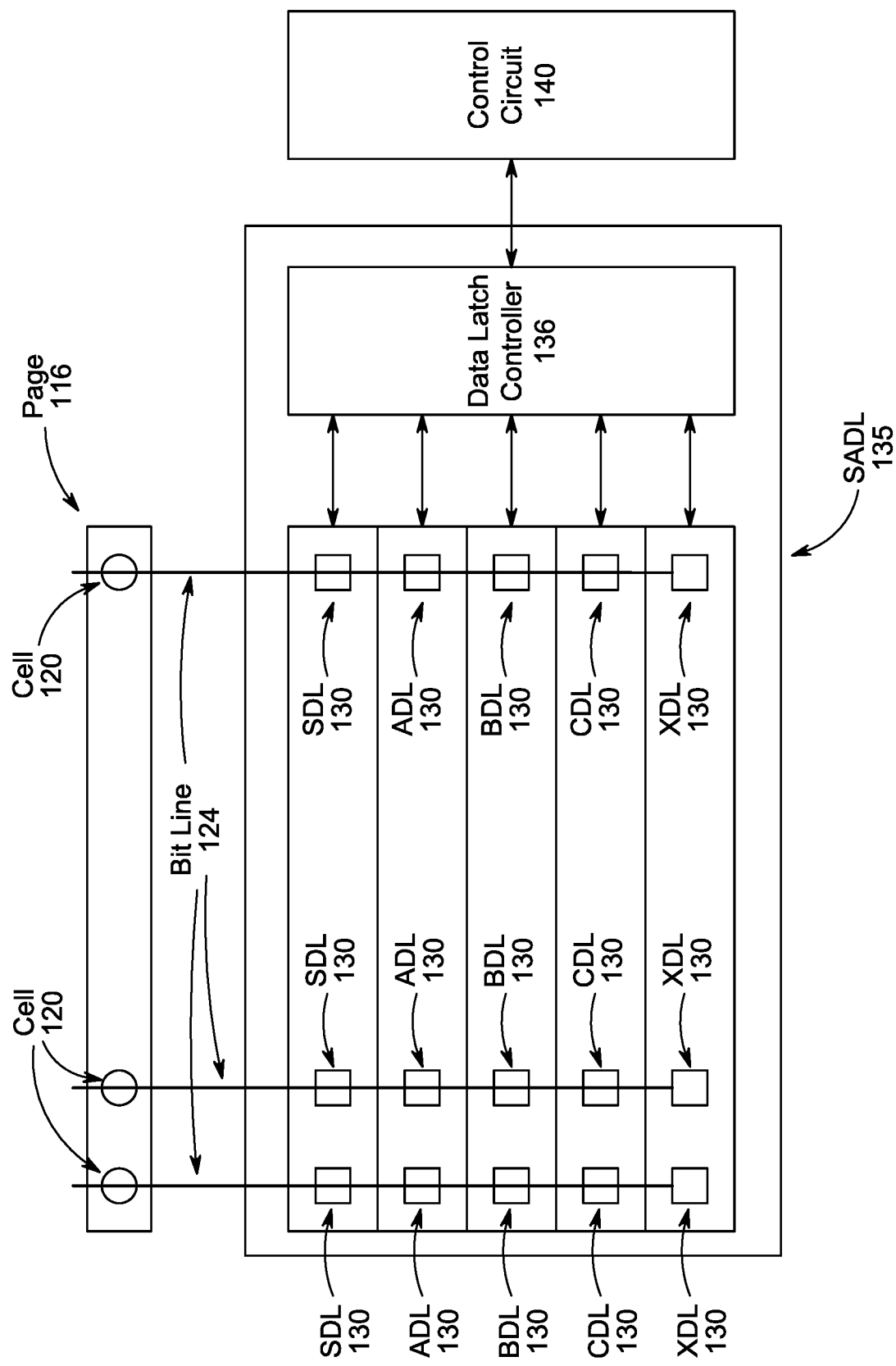
FIG. 1D shows a block diagram of some of the example components of the SADL of a NAND flash memory device, in accordance with the disclosures herein.

Each BL 124 has a corresponding COL address and is connected to one or more (e.g., 5 or 6) data latches in the SADL 135. FIG. 1D shows a block diagram of some of the example components of the SADL 135. The SADL 135 includes volatile static random-access memory (SRAM), also referred as data latches 130. For illustrative purposes, the data latches 130 are given arbitrary labels SDL, ADL, BDL, CDL, and XDL. Each SDL data latch 130 is connected to a corresponding bit line 124, and data latches 130 ADL, BDL, CDL, SDL, XDL sharing a same column line (bit line 124) are connected to each other as shown. The control circuit 140 provides commands to the data latch controller 136 to execute operations (e.g., read/write operations between data latches 130). The data latch controller 136 receives commands and controls the data latches in the SADL 135 to execute primitive operations (e.g., copy XDL data to SDL", "reset all XDL data to 0", "store the result of XOR operation between ADL and BDL to XDL").

In an example, in order to read data from a cell 120, a read operation command (e.g., from a flash memory controller 102) with the page address is used by an application (e.g., algorithm) or user to read the stored contents on a page 116. Following a read operation, the pass/fail ('PT') data of each cell 120 may be first stored in the corresponding SDL data latch 130. A command indicating "copy SDL data to XDL" is issued to set the read data in the XDL data latch 130. A read out operation command with the full address of the desired cell 120, including the page address and the COL address, is used to transfer the data from the XDL data latch 130, to the external algorithm or user. The COL address provides the starting cell 120 in the page 116 in which the data is accessed, such that data from multiple cells 120 in a page 116 can be read sequentially.

In an example, in order to store data to cells 120, program operation commands may be used to indicate the page data, the page address and a program mode (e.g., SLC, TLC, MLC, QLC, or any other type of multi-bit cell). As explained above, SLC program mode enables storage of 1 bit per cell 120 in the page 116, MLC program mode enables storage of 2 bits per cell 120 in the page 116, TLC program mode enables storage of 3 bits per cell 120 in the page 116, and QLC program mode enables storage of 4 bits per cell 120 in the page 116.

Figure 1E:
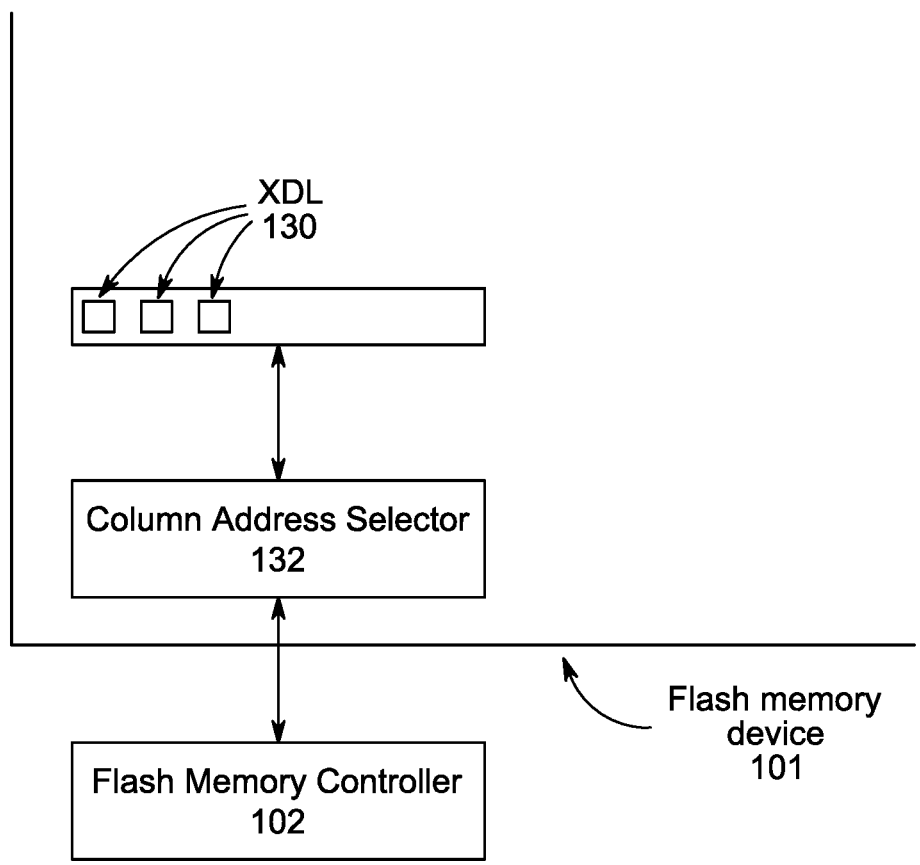
FIG. 1E shows a block diagram of an example interaction between a flash memory controller external to the flash memory device, and the column address selector, in accordance with the disclosures herein.

FIG. 1E shows a block diagram of an example interaction between a flash memory controller 102 external to the flash memory device 101, and the column address selector 132. The flash memory controller 102 may execute read and write commands to the flash memory device by providing column addresses to the column address selector 132. The flash memory controller 102 may write data to XDL data latches 130 by providing a column address indicating the starting cell 120 to store the data. Similarly, the flash memory controller 102 may retrieve data from XDL data latches 130 by providing, to the column address selector 132, the column address of the starting cell 120 of the read out data.

In an example, to begin usage of the NAND flash memory chip 101, a power on reset (POR) operation may be used (e.g., as initiated by a POR command from the flash memory controller 102). In response to the POR operation, the NAND flash memory chip 101 reads the data stored inside a specially indicated page 116 referred to as a FROM region, which stores necessary data to operate the NAND flash memory chip 101. For example, data stored in the FROM region may indicate the target threshold voltage Vt for a given program mode, among other things.

Figure 1F:
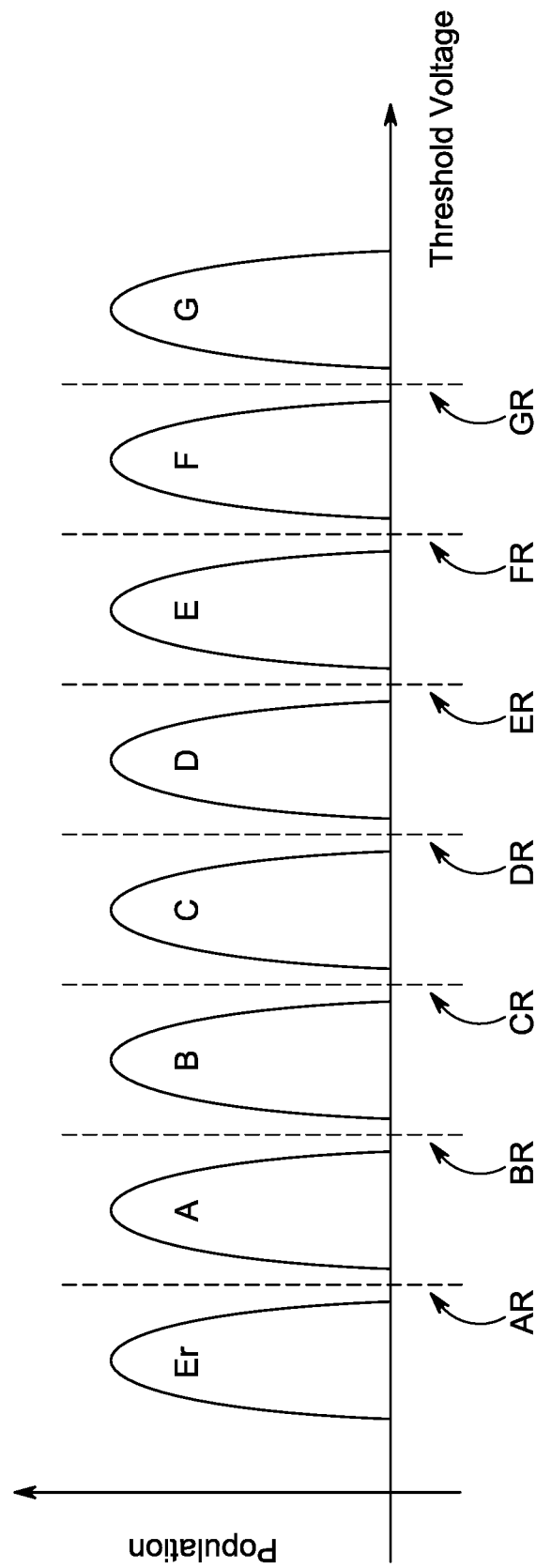
FIG. 1F shows an example threshold voltage Vt range of a 3-bit triple-level cell (TLC) program flash memory cell, in accordance with the disclosures herein.

A flash memory cell stores data in the form of a threshold voltage Vt, which is the lowest voltage at which the flash memory cell can be switched on. FIG. 1F shows an example threshold voltage Vt range of a 3-bit TLC program flash memory cell 120. The threshold voltage Vt range is divided into eight regions by seven target threshold voltages: AR, BR, CR, DR, ER, FR, GR. The region in which the actual threshold voltage Vt of a flash cell falls represents the cell's current state from among Er (erased), A, B, C, D, E, F or G (the labeling is arbitrary, and other labels may be used). The programed cell 120 is in state Er if the threshold voltage Vt of the cell is under the target threshold voltage AR. The programed cell is in state A if the threshold voltage Vt of the cell is between the target threshold voltages AR and BR, and similarly for the other states. Each state decodes into a corresponding 3-bit value that is stored in the flash memory cell (e.g., 000, 001 . . . 111). The threshold voltage Vt is defined similarly for other program modes and any other type of multi-bit cells (e.g., for 2-bit MLC flash memory cells, the threshold voltage Vt range is divided into four regions by three target threshold voltages and stores corresponding 2-bit values; for 4-bit QLC flash memory cells, the threshold voltage Vt range is divided into sixteen regions by fifteen target threshold voltages and stores corresponding 4-bit values).

According to the disclosures herein, a disclosed NAND PUF, which may be implemented in a NAND flash memory device, utilizes the large page size and variance of the threshold voltage Vt of the cells in the NAND flash memory chip to generate a natural random sequence, and stores and applies the natural random sequence as digital fingerprint to target data. The natural random sequence generated by the disclosed NAND PUF has the features that it is unpredictable, uncontrollable, and depends on the uniqueness of the random physical factors of the underlying the physical microstructures.

Figure 2:
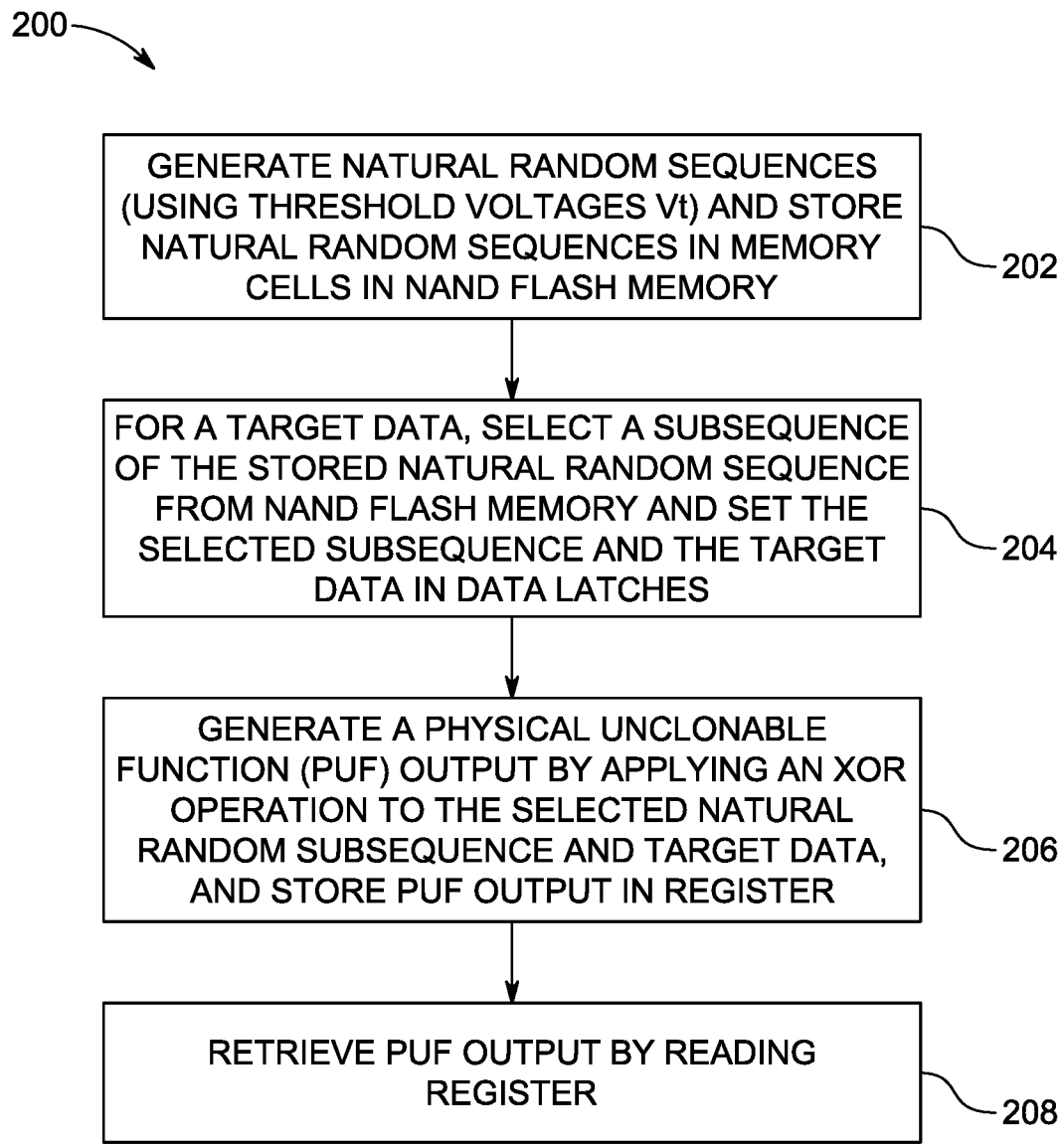
FIG. 2 shows a flow diagram of a NAND physical unclonable function (PUF) procedure that may be implemented in a NAND flash memory device as in FIGS. 1A, 1B and 1C, in accordance with the disclosures herein.

FIG. 2 shows a flow diagram of a NAND PUF procedure 200, that may be implemented for example in the NAND flash memory device 101 based on commands from the flash memory controller 102, as illustrated in FIGS. 1A-1F.

With reference to FIG. 2, at step 202, a unique natural random sequence of bits may be generated, based on the threshold voltages Vt of a sequence of cells stored in a page of a memory cell array (see example procedure 400 in FIG. 4), and the natural random sequence may be stored in memory cells in the NAND flash memory. For example, the natural random sequence may be stored with an SLC program, MLC program, TLC program, QLC program, or any other type of multi-bit cell program. In an example, the natural random sequence may be stored in sequential cells in a same page in the memory cell array. In this case, the natural random sequence may be retrieved and read using the page address and COL key of the first cell storing the natural random sequence. The address (e.g., page address+ COL key) for the stored natural random sequence may be stored on the NAND flash memory chip itself or external to the NAND flash memory chip (e.g., in the flash memory controller or an external storage device). For example, the natural random sequence may be stored with an SLC program in memory cells in a specified memory region for a user (e.g., user read only memory (UROM)) in the NAND flash memory chip. In an example, the address of the stored natural random sequence may be stored. For example, the address of the stored natural random sequence may be stored in the FROM region of the NAND flash memory chip, or in any other page of the NAND flash memory chip.

At step 204, for a given target data, a subsequence (which may include the entire sequence) of the stored natural random sequence is selected and the target data and selected subsequence are set in (written to) the data latches (e.g., data latches 130 in FIG. 1D). In an example, the target data may be provided by the flash memory controller (e.g., flash memory controller 102 in FIG. 1A). An address key (e.g., page address+COL address) determines which natural random sequence or subsequence is used and refers to an address in the natural random sequence region (i.e., the region of the memory cell array that stores the natural random sequence). In an example, the COL key determines the start bit to be used for the selected subsequence of the natural random sequence. Any subsequence of natural random sequence may be used, including the entire sequence.

At step 206, the PUF output is generated by applying an XOR operation to the selected subsequence of the natural random sequence and the target data, and the PUF output may be stored in memory (e.g., in a data latch or register 130 in the SADL 135 of FIGS. 1C and 1D). In an example, the XOR operation (inside the SADL 135) may be initiated by a command (e.g., control circuit 140 in the flash memory device 101 of FIG. 1C). At step 208, the PUF output can be retrieved as needed (e.g., by a command from the controller) by performing a register read in the SADL (e.g., the data may be stored in the XDL register and the XDL data may retrieved by the controller by a pin toggle).

Figure 3:
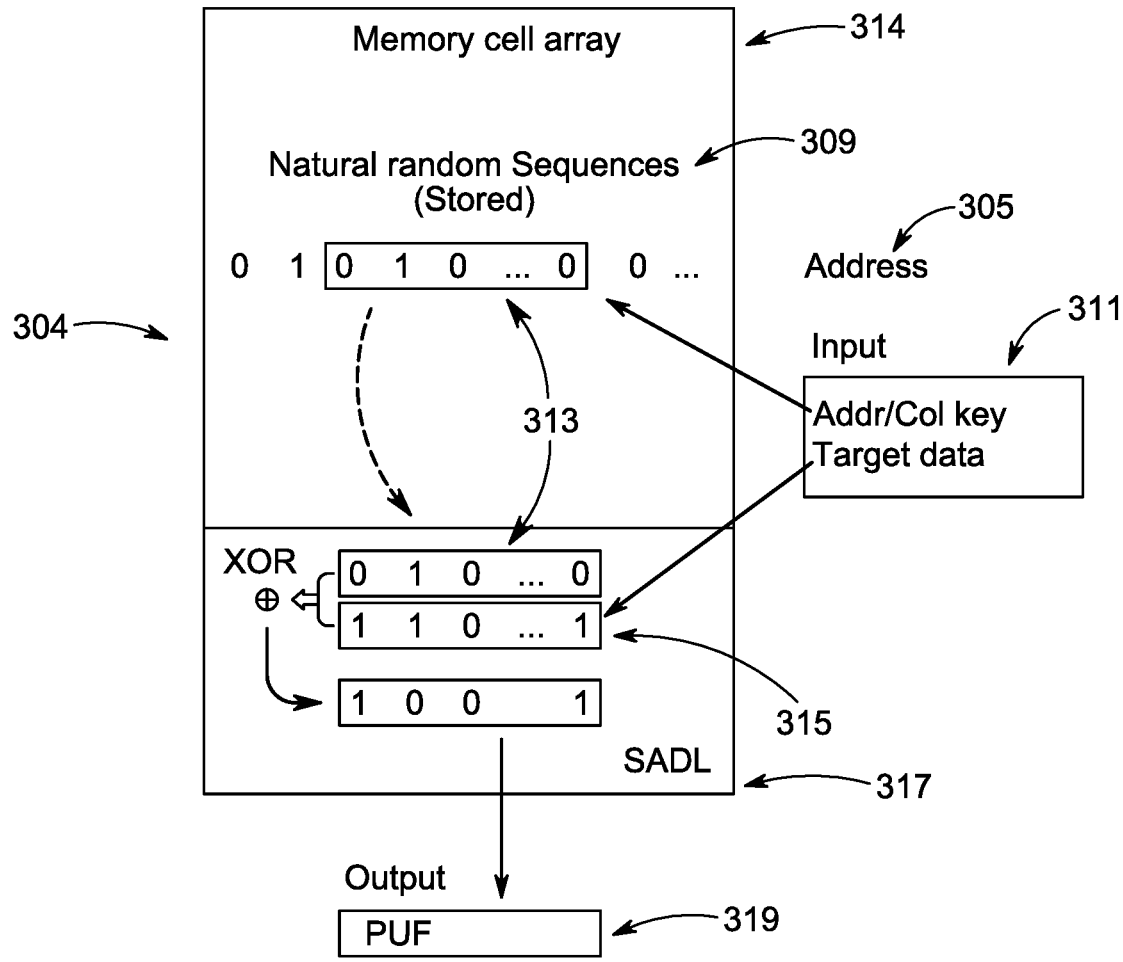
FIG. 3 shows an example of the PUF procedure of FIG. 2 implemented in a memory cell array of a flash memory device, in accordance with the disclosures herein.

FIG. 3 shows an example of the PUF procedure 200 implemented in a memory cell array 314 of a flash memory device 304 (e.g., flash memory device 101 of FIGS. 1A and 1B). As shown in FIG. 3, the natural random sequence 309 may be stored at an address 305 of the memory cell array 314 (i.e., the address 305 refers to an address in the natural random sequence region). Each of the bits '0', '1', '0', '1', '0', . . . , '0', '0', . . . of the natural random sequence 309 may be stored in cells on a common page. A PUF input command(s) 311 may be provided to the memory cell array 314, for example from a flash memory controller (e.g., flash memory controller 102 of FIG. 1A). The PUF input command(s) 311 may include, but is not limited to include, the address (e.g., column address and/or page address) of the desired subsequence 313 of the natural random sequence 309, the target data 315 that needs encryption, and/or a command to set the selected subsequence 313 and the target data 315 to the SADL region 317. The PUF input command(s) 311 may further include a command to apply an XOR operation inside the SADL 317 between the desired subsequence 313 and the target data 315 to generate the PUF output 319. The PUF output can be stored in the memory cell array 314 (e.g., in the SADL region 317) and/or can be provided via I/O pins directly to an external system or controller (e.g., flash memory controller 102 of FIG. 1A).

According to the disclosures herein, the natural random sequence used in the disclosed NAND PUF is generated using the values of the threshold voltage Vt in a sequence of cells in a page of a NAND memory array. In an example, for a TLC program where each cell can store 3 bits (i.e., numbers 1-8), the Vt distribution may be given the values Er, A, B, C, D, E, F, G in order from lower Vt to upper Vt. In another example, for a QLC program where each cell 120 can store 4 bits (i.e., numbers 1-16), the Vt distribution may be given the values S0, S1, S2, . . . , S15 in order from lower Vt to upper Vt. The Vt distribution may be similarly defined for any other type of multi-level cell program. The procedure for generating the natural random sequence is described in detail with respect to FIG. 4.

Figure 4:
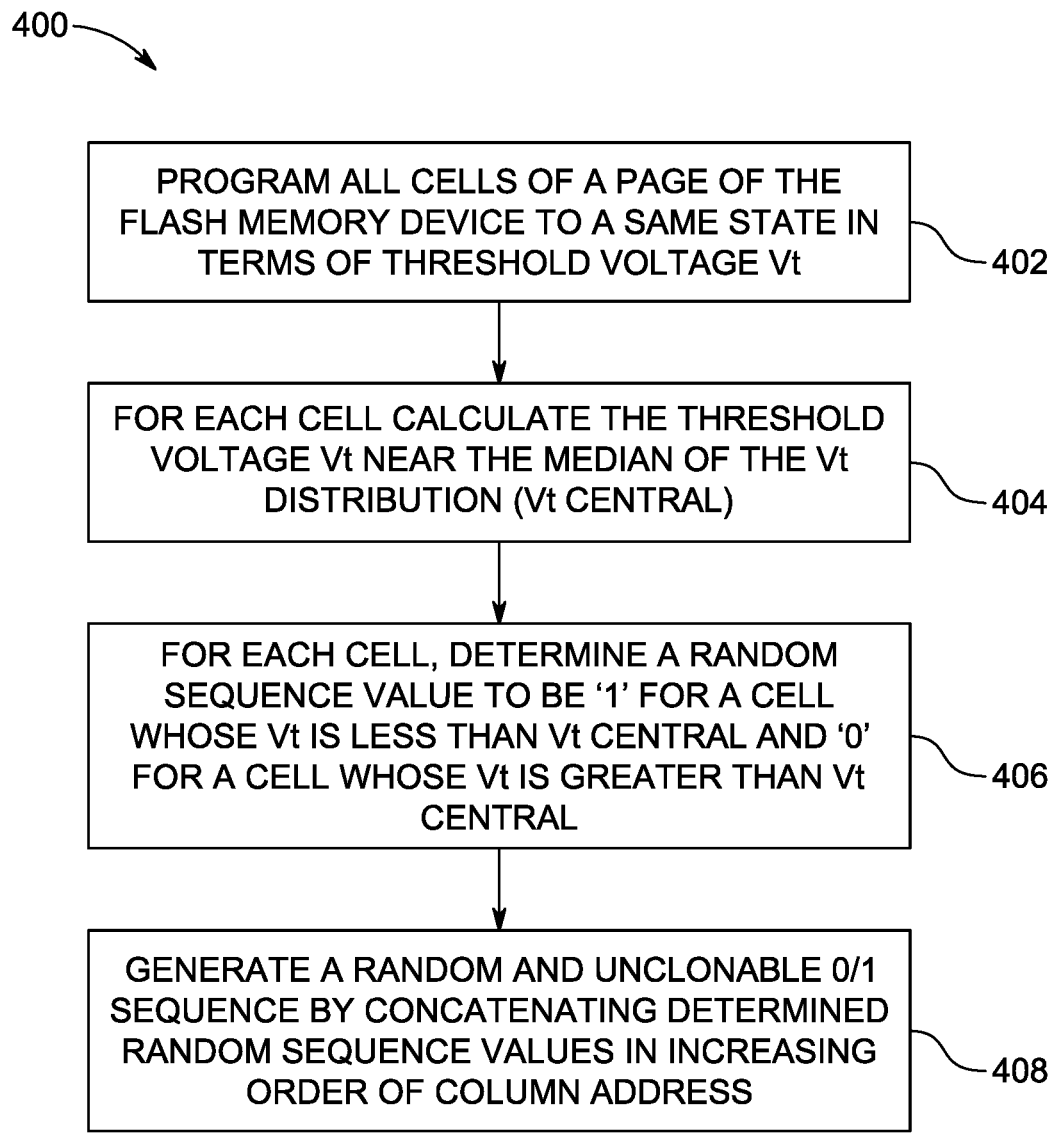
FIG. 4 shows a natural random sequence generation procedure that may be implemented for example in a NAND flash memory device as in FIGS. 1A, 1B and 1C, in accordance with the disclosures herein.

FIG. 4 shows a natural random sequence generation procedure 400 that may be implemented for example in the NAND flash memory device 101 based on commands from the flash memory controller 102, as shown in FIGS. 1A-1C. The natural random sequence generation procedure 400 may be used in step 202 of the NAND PUF procedure 200 of FIG. 2.

With reference to FIG. 4, at step 402, all the cells of a page of a NAND flash memory device may be programmed to a same state in terms of threshold voltage Vt. For example, for a TLC program where each cell can store 3 bits and the Vt distribution has values Er, A, B, C, D, E, F, G in order from lower Vt to upper Vt (as shown in FIG. 1F), the cells in a page may be programmed to all C state.

Figure 5A:
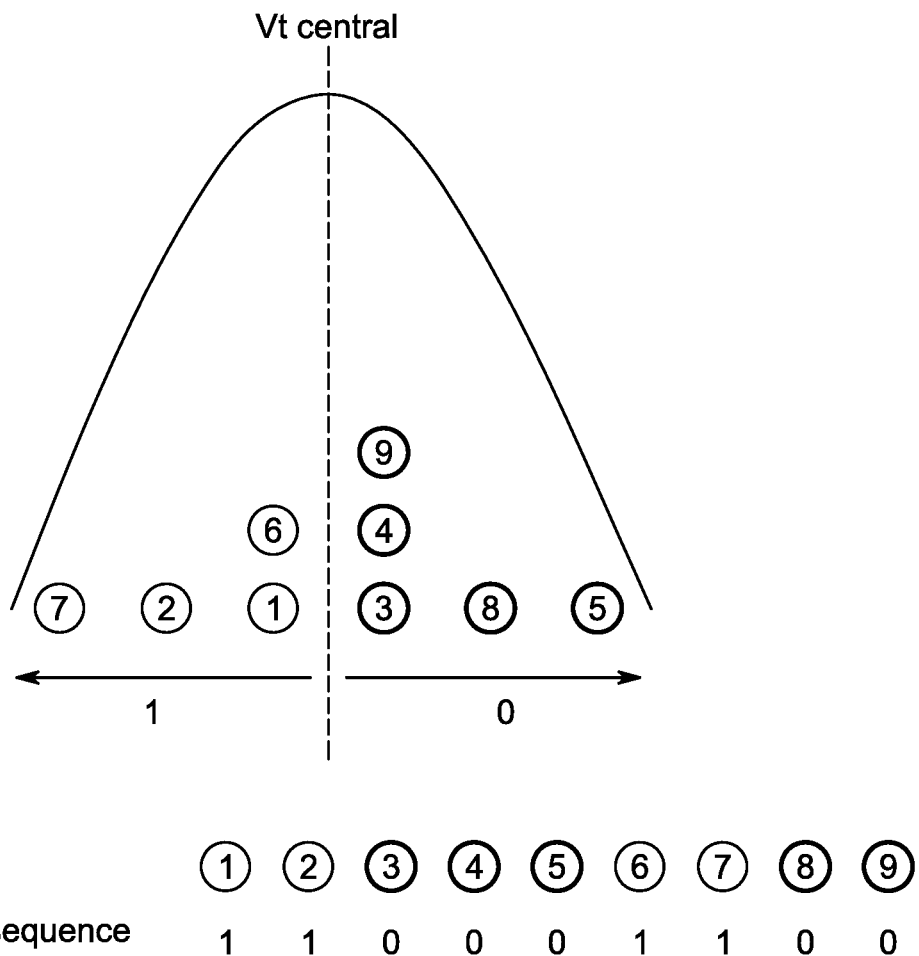
FIG. 5A shows an example threshold voltage Vt distribution, and the median of the threshold voltage Vt distribution, Vt central, in accordance with the disclosures herein.

At step 404, the threshold voltage Vt near the median of the Vt distribution (Vt central) may be calculated for the page. At step 406, for each cell, the random sequence value may be set to '1' for a cell for which the threshold voltage Vt is less than Vt central, and '0' for a cell for which the threshold voltage Vt is greater than Vt central. At step 408, the random and unclonable natural random sequence may be generated by concatenating the determined random sequence values. FIG. 5A shows an example threshold voltage Vt distribution, and the median of the Vt distribution, Vt central. For a sequence of cells in a page, indexed by column address, the value of the threshold voltage Vt is compared to the median Vt central. Threshold voltage values above Vt central are assigned a value of '0', and threshold voltage values below Vt central are assigned a value of '1' to generate the natural random sequence (other values may be assigned similarly).

Figure 5B:
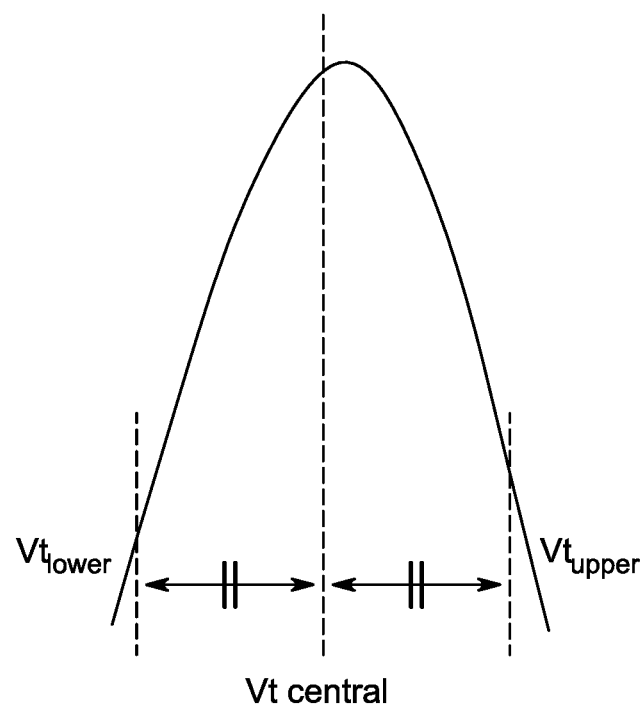
FIG. 5B shows an example approach for calculating Vt central from a threshold voltage Vt distribution, in accordance with the disclosures herein.

FIG. 5B shows an example approach for calculating Vt central from a threshold voltage Vt distribution. For example, a valley search may be used to detect the upper and lower parts of Vt distribution ($Vt_{upper}$, $Vt_{lower}$). The following equation may be used to calculate the Vt central to be approximately the median of the threshold voltage Vt distribution:

$$Vt_{central} = \frac{Vt_{upper} + Vt_{lower}}{2} \qquad \text{Equation 1}$$

Figure 5C:
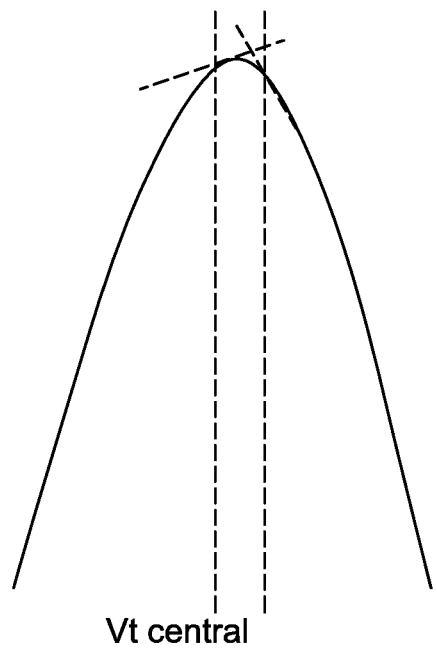
FIG. 5C shows another example approach for calculating Vt central from a threshold voltage Vt distribution, in accordance with the disclosures herein.

In other examples, different values of Vt central may be used that are not at or near the median of the threshold voltage Vt distribution. FIG. 5C shows another example approach for calculating Vt central from a threshold voltage Vt distribution. In the example of FIG. 5C, the top of the distribution (maximum point of the distribution curve) may be searched, for example using an algorithm similar to a valley search such that the read operation is repeated with incremented voltage value. For each iteration of the read operation, the number of "0 values are counted, and the repetition ends when the number of "0" values is less than the previous number of "0". The voltage determined at the final iteration is used as Vt central.

The disclosed PUF procedure and natural random sequence procedure provide easy and efficient approaches to generating long random number sequences and retrieving any length subsequences. The SADL structure inside the NAND flash memory makes it easy to perform XOR operations on long bit sequences, and thus the disclosed PUF procedure is useful for any ciphering techniques that use XOR operations (e.g., Verman cipher). The disclosed PUF procedure and resulting natural random sequences and PUF outputs described herein may be used in a variety of applications and use cases and a variety of cryptographic methods (e.g., Vernam cipher, Stream cipher, Advanced Encryption Standard process (AES)). Some example use cases are described in the following for illustrative purposes, although the disclosed procedures and systems may be used in any cryptographic application.

Figure 6:
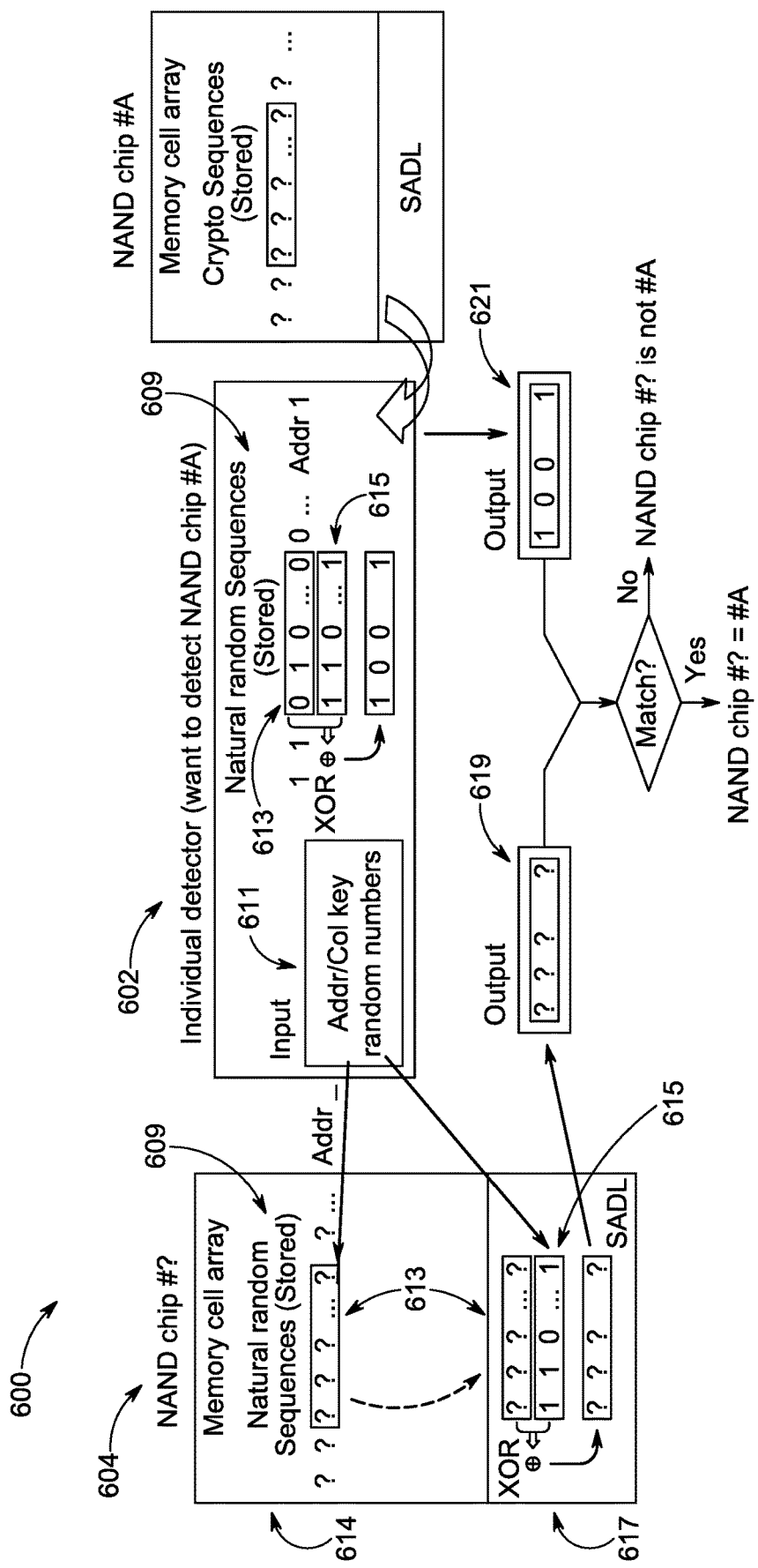
FIG. 6 shows a block diagram of an example individual recognition system employing a PUF procedure to detect the identity of a NAND flash memory chip, in accordance with the disclosures herein.

FIG. 6 shows a block diagram of an example individual recognition system 600 employing a PUF procedure to detect the identity of a NAND flash memory chip, in accordance with the disclosures herein. An individual detector system 602 (e.g., implemented in a main system or processor 104 in FIG. 1A) checks the identity of NAND memory chips in order to detect if the identity of a NAND memory chip matches the desired identity (e.g., NAND memory chip 604).

Similar to the PUF procedure implemented in the memory cell array 314 in FIG. 3, a PUF procedure may be implemented in the NAND memory chip 604, and the natural random sequence is stored at an address in the memory cell array 614. The individual detector 602 also initially stores the natural random sequence 609 in local memory. In order to perform an identity detection, the individual detector system 602 provides a PUF input command(s) 611 to the memory cell array 614 including the address (page address+ COL key) of a desired subsequence 613 of the natural random sequence 609, and target data 615 in the form of a random number. The PUF input command(s) 611 further includes a command to apply an XOR operation inside the SADL 617 between the desired subsequence 613 and the target data 615 to generate the PUF output 619. The individual detector system 602 locally calculates an XOR operation between the locally stored subsequence 613 of the natural random sequence 609 and the same target data to generate output 621. By comparing the PUF output 619 to the output 621, the individual detector system 602 can determine if the identity of the NAND flash memory chip 604 matches the desired identity.

Figure 7:
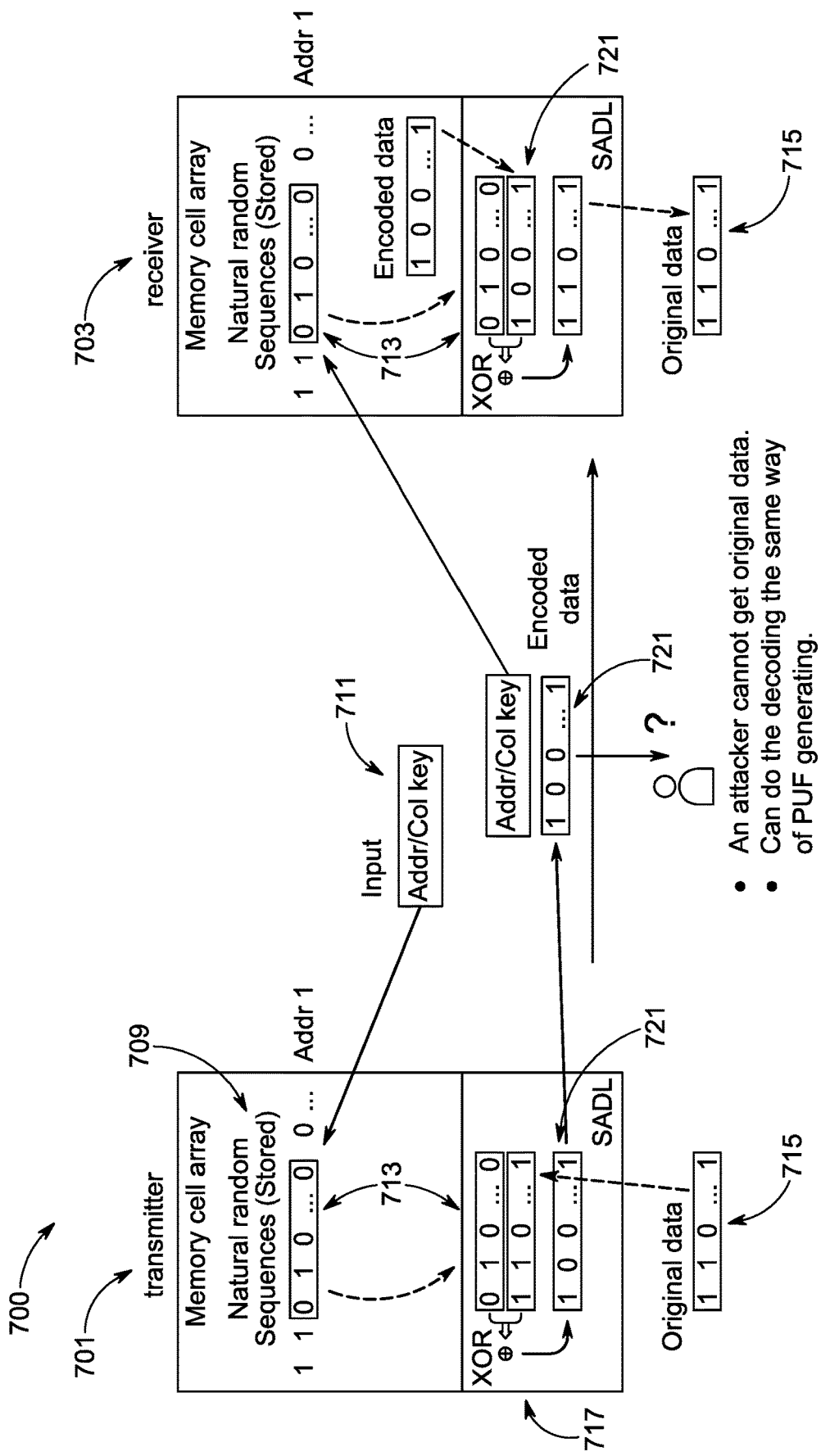
FIG. 7 shows a block diagram of an example secure data transfer system between a transmitter NAND flash memory chip and a receiver NAND flash memory chip employing a PUF procedure, in accordance with the disclosures herein.

FIG. 7 shows a block diagram of an example secure data transfer system 700 between a transmitter NAND flash memory chip 701 and a receiver NAND flash memory chip 703 employing a PUF procedure, in accordance with the disclosures herein. In the example of FIG. 7, the transmitter NAND flash memory chip 701 and the receiver NAND flash memory chip 703 have the same natural random sequence 709 stored locally in their respective memory cell array. Original data 715 can be securely transferred from the transmitter NAND flash memory chip 701 by encoding (using an XOR function) the original data 715 with a desired subsequence 713 of the natural random sequence 709 to generate the encoded data 721, which may be securely transferred (e.g., the transferring path may be for example a local area network (LAN), the Internet, radio waves or some kind of controller or external device). The address/Col key and encoded data 721 may be transferred simultaneously.) to the receiver NAND flash memory chip 703. The receiver 703 may be provided with the corresponding address of the desired subsequence 713 along with the encoded data and the receiver NAND flash memory chip 703 can successfully decode the original data using the same subsequence 713.

Many variations are possible based on the disclosure herein. Although features and elements are described above in particular combinations, each feature or element can be used alone without the other features and elements or in various combinations with or without other features and elements.

The systems and procedures described herein may be implemented in hardware, and/or software. The methods provided may include implementation in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be mask works that are then used in a semiconductor manufacturing process to manufacture a processor which implements the methods described herein.

The methods or flow charts provided herein may be implemented in a computer program, software, or firmware incorporated in a non-transitory computer-readable storage medium for execution by a general purpose computer or a processor. Examples of non-transitory computer-readable storage mediums include a ROM, a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A NAND flash memory device comprising:
   a memory cell array configured to:
      generate an unclonable natural random sequence of bits based on a threshold voltage of a plurality of cells in the memory cell array;
      store the unclonable natural random sequence of bits starting at an address in a page of the memory cell array;
   a plurality of data latches configured to:
      store a selected subsequence of the unclonable natural random sequence of bits in a first set of data latches;
      store a target data in a second set of data latches; and
      generate a physical unclonable function (PUF) output by applying an XOR operation to the target data and the selected subsequence; and
   a set of registers configured to store the PUF output.

2. The NAND flash memory device of claim 1, configured to receive commands from a flash memory controller, wherein the commands instruct the NAND flash memory device at least to generate the unclonable natural random sequence of bits and generate the PUF output.

3. The NAND flash memory device of claim 1, wherein the memory cell array is configured to generate the unclonable natural random sequence of bits by:
   programming the plurality of cells to a same state of threshold voltage; and
   for each cell in the plurality of cells, calculating a threshold voltage near a median of a threshold voltage distribution and determine a random sequence value to be '1' for a cell with the threshold voltage less than the median and '0' for a cell with the threshold voltage greater than the median.

4. The NAND flash memory device of claim 3, wherein the plurality of cells are single-level cells (SLCs) that store 1 bits per cell or triple-level cells (TLCs) that store 3 bits per cell.

5. The NAND flash memory device of claim 1, wherein the memory cell array is further configured to store the address of the unclonable natural random sequence of bits is stored in a FROM region.

6. The NAND flash memory device of claim 1, wherein the set of registers are configured to provide the PUF output to a flash memory controller to be used to detect a true identity of the NAND flash memory device.

7. The NAND flash memory device of claim 1, wherein the set of registers are configured to provide the PUF output to a flash memory controller for secure data transfer of the target data to a receiver NAND flash memory device.

8. A method performed by a NAND flash memory device, the method comprising:
   generating an unclonable natural random sequence of bits based on a threshold voltage of a plurality of cells in a memory cell array of the NAND flash memory device;
   storing, in a page of the memory cell array, the unclonable natural random sequence of bits starting at an address;
   storing, in a first set of data latches of the memory cell array, a selected subsequence of the unclonable natural random sequence of bits;
   storing, in a second set of data latches of the memory cell array, a target data; and
   generating a physical unclonable function (PUF) output by applying an XOR operation to the target data and the selected subsequence; and
   storing, in a set of registers, the PUF output.

9. The method of claim 8, further comprising:
   receiving commands from a flash memory controller, wherein the commands instruct the NAND flash memory device at least to generate the unclonable natural random sequence of bits and generate the PUF output.

10. The method of claim 8, wherein the unclonable natural random sequence of bits is generated by:
    programming the plurality of cells to a same state of threshold voltage; and
    for each cell in the plurality of cells, calculating a threshold voltage near a median of a threshold voltage distribution and determine a random sequence value to be '1' for a cell with the threshold voltage less than the median and '0' for a cell with the threshold voltage greater than the median.

11. The method of claim 10, wherein the plurality of cells are single-level cells (SLCs) that store 1 bits per cell or triple-level cells (TLCs) that store 3 bits per cell.

12. The method of claim 8, further comprising storing the address of the unclonable natural random sequence of bits in a FROM region of the memory cell array.

13. The method of claim 8, further comprising providing the PUF output to a flash memory controller to be used to detect a true identity of the NAND flash memory device.

14. The method of claim 8, further comprising providing the PUF output to a flash memory controller for secure data transfer of the target data to a receiver NAND flash memory device.

15. A NAND flash memory device comprising:
    means for generating an unclonable natural random sequence of bits based on a threshold voltage of a plurality of cells in a memory cell array of the NAND flash memory device;
    means for storing, in a page of the memory cell array, the unclonable natural random sequence of bits starting at an address;
    means for storing, in a first set of data latches of the memory cell array, a selected subsequence of the unclonable natural random sequence of bits;
    means for storing, in a second set of data latches of the memory cell array, a target data; and
    means for generating a physical unclonable function (PUF) output by applying an XOR operation to the target data and the selected subsequence; and
    means for storing, in a set of registers, the PUF output.

16. The NAND flash memory device of claim 15, further comprising:
    means for receiving commands from a flash memory controller, wherein the commands instruct the NAND flash memory device at least to generate the unclonable natural random sequence of bits and generate the PUF output.

17. The NAND flash memory device of claim 15, further comprising:
    means for programming the plurality of cells to a same state of threshold voltage; and
    for each cell in the plurality of cells, means for calculating a threshold voltage near a median of a threshold voltage distribution and determine a random sequence value to be '1' for a cell with the threshold voltage less than the median and '0' for a cell with the threshold voltage greater than the median.

18. The NAND flash memory device of claim 15, further comprising means for storing the address of the unclonable natural random sequence of bits in a FROM region of the memory cell array.

19. The NAND flash memory device of claim 15, further comprising means for providing the PUF output to a flash memory controller to be used to detect a true identity of the NAND flash memory device.

20. The NAND flash memory device of claim 15, further comprising means for providing the PUF output to a flash memory controller for secure data transfer of the target data to a receiver NAND flash memory device.

* * * * *